United States Patent
Chae

(10) Patent No.: US 11,347,654 B2
(45) Date of Patent: May 31, 2022

(54) STORAGE DEVICE INCLUDING NONVOLATILE MEMORY DEVICE AND OPERATING METHOD THEREOF

(71) Applicant: SAMSUNG ELECTRONICS CO., LTD., Suwon-si (KR)

(72) Inventor: Heechul Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 16/533,901

(22) Filed: Aug. 7, 2019

(65) Prior Publication Data

US 2020/0159668 A1 May 21, 2020

(30) Foreign Application Priority Data

Nov. 16, 2018 (KR) .......... 10-2018-0141638

(51) Int. Cl.
*G06F 12/1009* (2016.01)
*G06F 12/02* (2006.01)
*G06F 3/06* (2006.01)
*G06F 9/54* (2006.01)

(52) U.S. Cl.
CPC ........ *G06F 12/1009* (2013.01); *G06F 3/0607* (2013.01); *G06F 3/0652* (2013.01); *G06F 3/0658* (2013.01); *G06F 3/0659* (2013.01); *G06F 9/544* (2013.01); *G06F 12/0246* (2013.01); *G06F 3/0679* (2013.01)

(58) Field of Classification Search
CPC .. G06F 12/1009; G06F 3/0607; G06F 3/0652; G06F 3/0658; G06F 3/0659; G06F 9/544; G06F 12/0246; G06F 3/0679
See application file for complete search history.

(56) References Cited

U.S. PATENT DOCUMENTS

| | | | |
|---|---|---|---|
| 6,901,499 B2 | 5/2005 | Aasheim et al. | |
| 8,171,205 B2 * | 5/2012 | Royer | G06F 12/0246 711/103 |
| 8,230,161 B2 | 7/2012 | Chu | |
| 8,429,352 B2 | 4/2013 | Sinclair | |
| 9,003,108 B2 | 4/2015 | Lasser | |
| 9,201,783 B2 * | 12/2015 | Song | G06F 12/0246 |
| 9,405,621 B2 | 8/2016 | Yu et al. | |
| 9,640,264 B2 | 5/2017 | Kim et al. | |
| 9,658,966 B2 | 5/2017 | Vishne et al. | |
| 10,025,788 B2 | 7/2018 | Davis et al. | |

* cited by examiner

*Primary Examiner* — Idriss N Alrobaye
*Assistant Examiner* — Richard B Franklin
(74) *Attorney, Agent, or Firm* — Volentine, Whitt & Francos, PLLC

(57) ABSTRACT

A storage device includes a nonvolatile memory device and a memory controller. After writing first data at the first page, the memory controller writes second data at a second page. The memory controller generates first check data corresponding to the first data and second check data corresponding to the second data. The memory controller recovers the first and second physical addresses and the first and second logical addresses based on the second check data.

19 Claims, 10 Drawing Sheets

STORAGE DEVICE INCLUDING NONVOLATILE MEMORY DEVICE AND OPERATING METHOD THEREOF

CROSS-REFERENCE TO RELATED APPLICATIONS

A claim of priority under 35 U.S.C. § 119 is made to Korean Patent Application No. 10-2018-0141638 filed on Nov. 16, 2018, in the Korean Intellectual Property Office, the entire content of which is hereby incorporated by reference.

BACKGROUND

The present disclosure relates to devices storing data, and more particularly to storage devices including nonvolatile memory devices and operating methods thereof.

Storage devices such as for example solid state drives (SSD) or universal flash storages (UFS) include nonvolatile memory devices. Since nonvolatile memory devices retain data stored therein when powered-off, nonvolatile memory devices are useful for storing data over long periods of time. Such storage devices may be used as main storage in various electronic devices such as for example computers, smartphones, and smart pads, or the like.

In order to perform various operations on a nonvolatile memory device, a storage device typically translates a logical address provided from a host to a physical address available in the nonvolatile memory device. The operation of translating a logical address to a physical address may be performed using a mapping table. However, it may happen that before a mapping table is updated in a nonvolatile memory device, the mapping table may be erased from a volatile memory (e.g., a buffer memory) included in the storage device due to an unexpected situation such as sudden power-off (SPO). In this case, it is necessary to recover the mapping table. However, an operation of recovering the mapping table may delay various subsequent operations including for example write operations, read operations, erase operations, or the like. Therefore, it is necessary to prevent delay due to the operation of recovering a mapping table.

SUMMARY

Embodiments of the inventive concepts provide a storage device including a nonvolatile memory device, whereby the storage device reduces a time needed to recover a map indicating relationship between logical addresses and physical addresses of data in the nonvolatile memory device, and an operating method thereof.

Embodiments of the inventive concepts provide a storage device includes a nonvolatile memory device and a memory controller. The nonvolatile memory device includes a memory area including a first page corresponding to a first physical address and a second page corresponding to a second physical address. After writing first data at the first page based on a first write command corresponding to a first logical address, the memory controller writes second data at the second page based on a second write command corresponding to a second logical address. The memory controller generates first check data corresponding to the first data and second check data corresponding to the second data. The memory controller recovers the first and second physical addresses and the first and second logical addresses based on the second check data.

Embodiments of the inventive concepts further provide an operating method of a storage device including a memory controller and a nonvolatile memory device. The method includes writing, by the memory controller, first data at a first page of the nonvolatile memory device, based on a first write command corresponding to a reference address; writing, by the memory controller, second data at a second page of the nonvolatile memory device, based on a second write command corresponding to a target address; and generating, by the memory controller, target check data corresponding to the second data, based on a continuity between the target address and an address generated before the target address that corresponds to a third write command, and based on a difference between the reference address and the target address.

Embodiments of the inventive concepts still further provide an operating method of a storage device including writing data in a memory area including a plurality of pages in order of physical page number; generating check data corresponding to each of the plurality of pages; reading a last page storing data from among the plurality of pages; and recovering a portion of a map indicating physical page numbers corresponding to logical page numbers, based on check data from among the generated check data that corresponds to the last page. The check data includes an offset value between a physical page number of a reference page of the plurality of pages and a physical page number corresponding to the check data.

Embodiments of the inventive concepts also provide a storage device including a nonvolatile memory device including a memory area having a plurality of pages in order of physical page number; and a memory controller configured to write data in the plurality of pages, generate check data corresponding to each of the plurality of pages, and write the check data in the plurality of pages. The check data of a corresponding page from among the plurality of pages includes an offset value between a physical page number of a reference page of the plurality of pages and a physical page number of the corresponding page.

Embodiments of the inventive concepts additionally provide a storage device including a nonvolatile memory device including a memory area having a plurality of pages in order of physical page number; and a memory controller configured to write first data at a first page from among the plurality of pages based on a first write command corresponding to a reference address, write second data at a second page from among the plurality of pages based on a second write command corresponding to a target address, and generate target check data corresponding to the second data. The target check data includes sequence data generated based on a continuity between the target address and an address generated before the target address that corresponds to a third write command, and offset data generated based on a difference between the reference address and the target address.

BRIEF DESCRIPTION OF THE FIGURES

The above and other objects and features of the inventive concepts will become apparent from the following detailed description of exemplary embodiments with reference to the accompanying drawings.

DETAILED DESCRIPTION

Hereinafter, embodiments of the inventive concepts will be described clearly and in detail with reference to the accompanying drawings to such an extent that one of ordinary skill in the art may implement embodiments of the inventive concepts.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
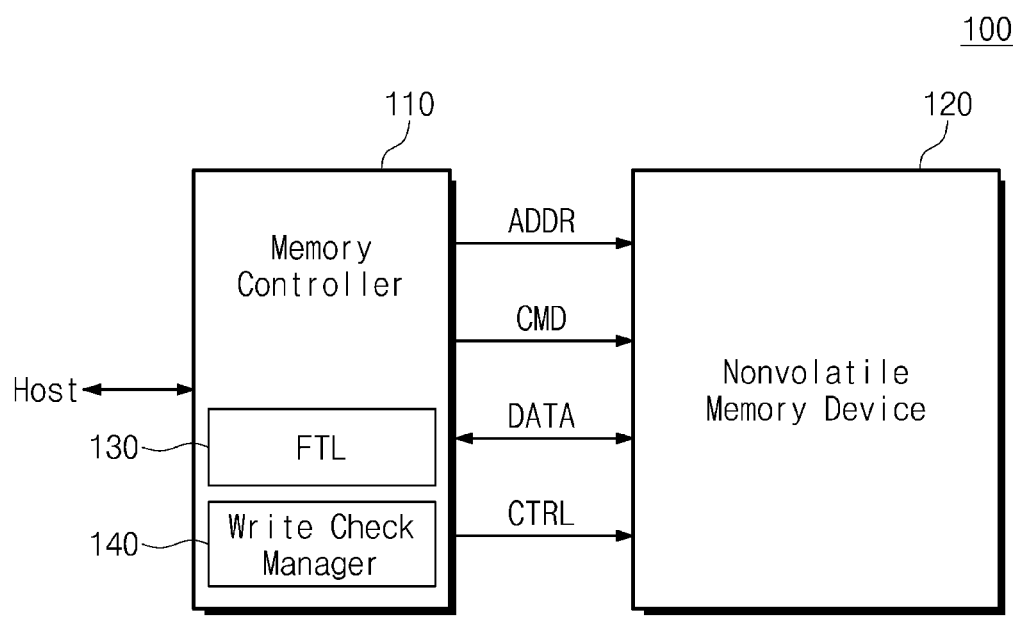
FIG. 1 illustrates a block diagram of a storage device according to embodiments of the inventive concepts.

FIG. 1 illustrates a block diagram of a storage device according to embodiments of the inventive concepts. Referring to FIG. 1, a storage device 100 includes a memory controller 110 and a nonvolatile memory device 120. The storage device 100 may for example be implemented in the form of, but not limited to, a solid state drive (SSD), a memory card, an embedded multimedia card (eMMC), or universal flash storage (UFS), or the like.

The memory controller 110 may control the nonvolatile memory device 120 under control of an external device such as a host (not shown). For example, in response to an external request, the memory controller 110 may write data "DATA" in the nonvolatile memory device 120, or may read the data "DATA" stored in the nonvolatile memory device 120. To this end, the memory controller 110 may transmit an address ADDR, a command CMD, and a control signal CTRL to the nonvolatile memory device 120.

The memory controller 110 may manage the storage device 100 by using a buffer memory (not shown in FIG. 1). For example, the memory controller 110 may temporarily store data to be written in the nonvolatile memory device 120, or data read from the nonvolatile memory device 120, in the buffer memory. For example, the memory controller 110 may store in the buffer memory metadata necessary to manage the nonvolatile memory device 120. For example, the memory controller 110 may store in the buffer memory a map for translating logical addresses to physical addresses such that a write operation, a read operation, and an erase operation, among other operations, are performed on the nonvolatile memory device 120.

The memory controller 110 drives a flash translation layer (FTL) 130. The flash translation layer 130 may define a correspondence relationship between a logical address provided from the host and a physical address of the nonvolatile memory device 120. For example, the correspondence relationship between the logical address and the physical address may be managed by using a mapping table. In addition, the flash translation layer 130 may perform maintenance operations such as for example a garbage collection operation, a read reclaim operation, a data recovery operation, and a data backup operation, among various other maintenance operations.

Also, the memory controller 110 drives a write check manager 140. The write check manager 140 may manage write data to be written in a storage space of the nonvolatile memory device 120 identified by an address, in the write operation associated with the nonvolatile memory device 120. The write check manager 140 may generate check data to be stored at a specified page together with the write data. The check data may include data which are provided to identify write data after the occurrence of an unexpected situation such as the loss of a map of the mapping table. For example, the unexpected situation may be a situation such as a sudden power-off in which power is not supplied to the storage device 100 and thus a map stored in the buffer memory (not shown) is erased.

The write check manager 140 may generate the check data by checking a sequentiality of a logical address and a physical address corresponding to the write data. The sequentiality may be determined by a correlation between an address (e.g., logical and physical page numbers) for a current write operation and an address for a past write operation (e.g., a write operation performed most recently before the current write operation). The check data may reflect this correlation, and the trend or history of a past write operation, as well as a current write operation, may be reflected in the check data. The write check manager 140 may be implemented by hardware such as one or more application specific integrated circuits (ASICs) or one or more field programmable gate arrays (FPGAs), or may be implemented with firmware, software, or a combination thereof. The check data will be more fully described hereinafter.

The memory controller 110 may recover the erased map, based on the check data. For example, an operation of recovering the map may be performed by the flash translation layer 130. The memory controller 110 may predict addresses according to past write operations as well as an address corresponding to the check data, based on the sequentiality of addresses reflected in the check data. For example, the memory controller 110 may recover addresses corresponding to a plurality of pages, based on the check data corresponding to one page. The map recovering operation will be more fully described hereinafter.

The nonvolatile memory device 120 may operate under control of the memory controller 110. For example, the nonvolatile memory device 120 may receive the address ADDR, the command CMD, and the control signal CTRL. The nonvolatile memory device 120 may store the data "DATA" in a space corresponding to the address ADDR, or may transmit the data "DATA" corresponding to the address ADDR to the memory controller 110.

The nonvolatile memory device 120 may for example include flash memory, phase-change random access memory (PRAM), ferroelectric RAM (FeRAM), magnetic RAM (MRAM), resistive RAM (RRAM), or the like.

Figure 2:
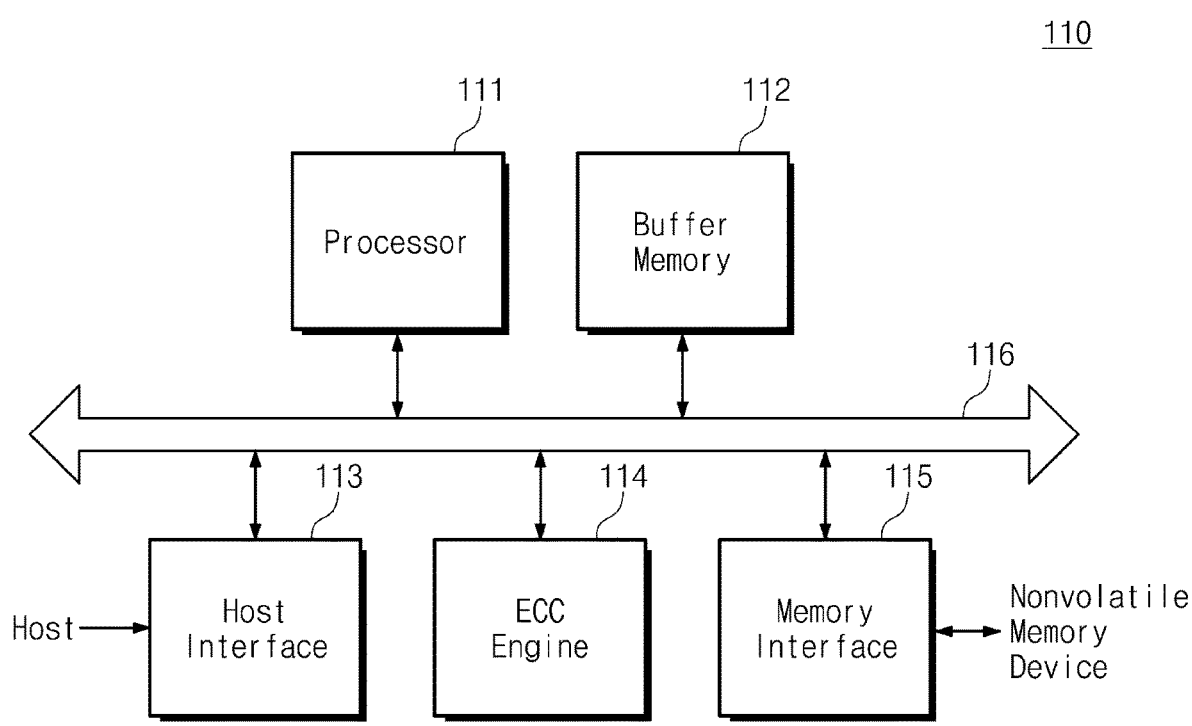
FIG. 2 illustrates a block diagram of a memory controller of FIG. 1.

FIG. 2 illustrates a block diagram of a memory controller of FIG. 1. Referring to FIG. 2, the memory controller 110 includes a processor 111, a buffer memory 112, a host interface 113, an error correction code (ECC) engine (i.e., an error correction code unit) 114, a memory interface 115, and a bus 116. For convenience of description, FIG. 2 will be described with reference to reference numerals/marks of FIG. 1.

The processor 111 may control overall operations of the memory controller 110 and may perform a logical operation. The processor 111 may communicate with an external host through the host interface 113 and may communicate with the nonvolatile memory device 120 through the memory interface 115. The processor 111 may control the storage device 100 by using the buffer memory 112.

The processor 111 may drive the flash translation layer 130 and the write check manager 140 of FIG. 1. The flash translation layer 130 may perform translation of a logical address to a physical address, and may perform a write operation on a memory area of the nonvolatile memory device 120 corresponding to the address ADDR. As the write check manager 140 is executed, the processor 111 may generate check data. As the flash translation layer 130 is executed, the processor 111 may recover a map erased from the buffer memory 112 through the check data. The check data refers to data which are generated by a correlation between an address for a current write operation and an address for a past write operation.

The buffer memory 112 may store codes or commands which are executed by the memory controller 110. The buffer memory 112 may store data processed by the memory controller 110. Software (or firmware) for controlling the memory controller 110 may be loaded onto the buffer memory 112. For example, in the case where the write check manager 140 is implemented by firmware, the write check manager 140 may be loaded onto the buffer memory 112 and may be executed by the processor 111. However, the inventive concepts are not limited thereto, and the write check manager 140 may for example be implemented with hardware such as one or more application specific integrated circuits (ASICs) or one or more field programmable gate arrays (FPGAs). The buffer memory 112 may correspond to the buffer memory described with reference to FIG. 1. The buffer memory 112 may be for example random access memory (RAM), such as for example static RAM (SRAM).

The host interface 113 may be configured to communicate with the host device under control of the processor 111. The host interface 113 may be configured to communicate according to any one of various communication protocols such as for example universal serial bus (USB), serial AT attachment (SATA), small computer system interface (SCSI), serial attached SCSI (SAS), high speed interchip (HSIC), peripheral component interconnection (PCI), PCI express (PCIe), nonvolatile memory express (NVMe), universal flash storage (UFS), secure digital (SD) card, multimedia card (MMC), embedded MMC (eMMC), dual in-line memory module (DIMM), registered DIMM (RDIMM), and load reduced DIMM (LRDIMM), or the like.

The error correction code engine 114 may generate an error correction code for data to be stored in the nonvolatile memory device 120. The error correction code engine 114 may detect an error of the data "DATA" read from the nonvolatile memory device 120 based on the error correction code and may correct the detected error.

The memory interface 115 is configured to communicate with the nonvolatile memory device 120 under control of the processor 111. For example, the memory interface 115 may convey the command CMD, the address ADDR, and the data "DATA" to the nonvolatile memory device 120 through an input/output channel. For example, the memory interface 115 may exchange a control signal with the nonvolatile memory device 120 through a control channel.

The bus 116 provides a communication path between the components of the memory controller 110. The processor 111, the buffer memory 112, the host interface 113, the error correction code engine 114, and the memory interface 115 may exchange data with each other through the bus 116. The bus 116 may be configured to support various types of communication formats which are used in the memory controller 110.

Figure 3:
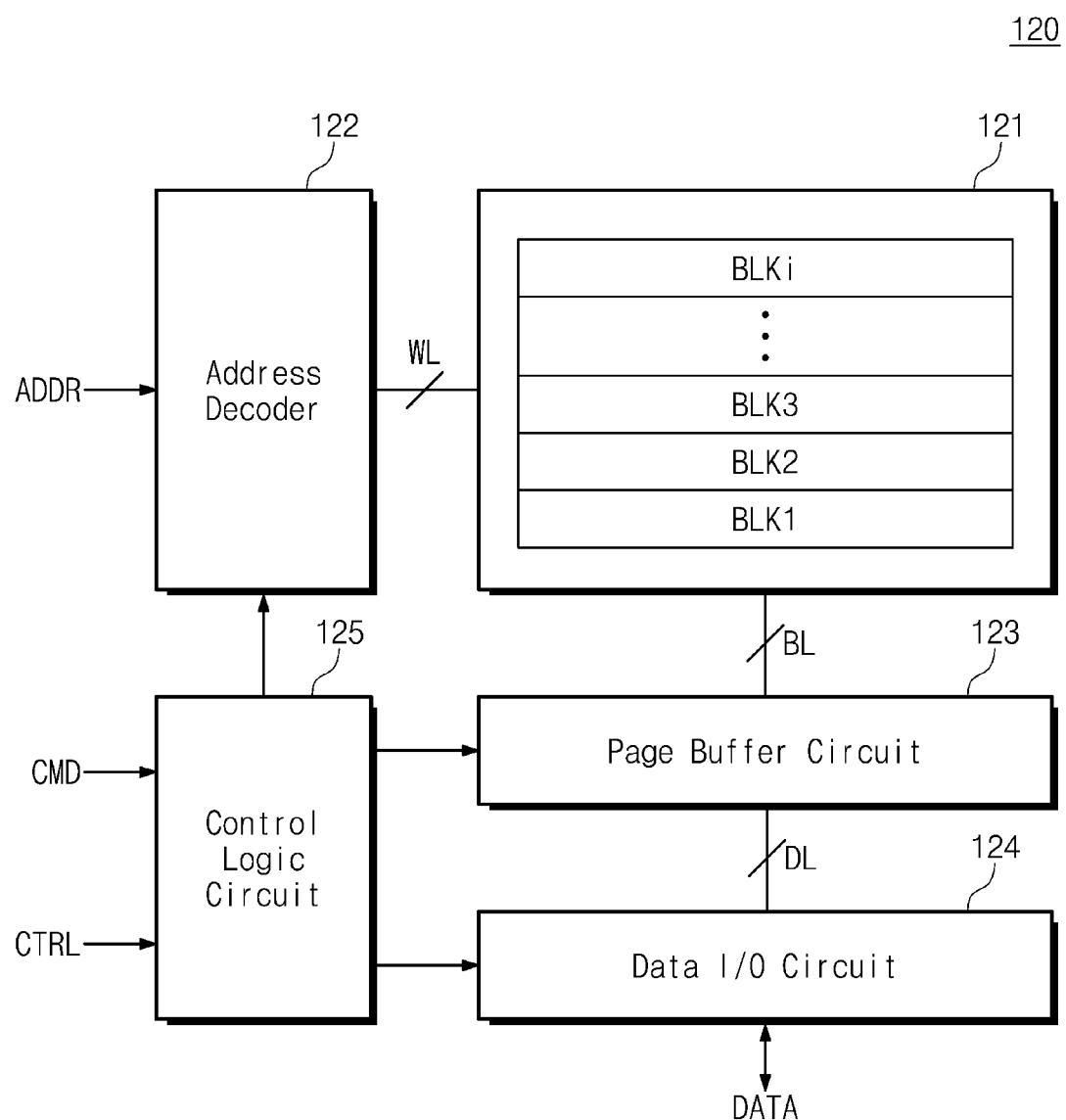
FIG. 3 illustrates a block diagram of a nonvolatile memory device of FIG. 1.

FIG. 3 illustrates a block diagram of a nonvolatile memory device of FIG. 1. Referring to FIG. 3, the nonvolatile memory device 120 includes a memory cell array 121, an address decoder 122, a page buffer circuit 123, a data input/output (I/O) circuit 124, and a control logic circuit 125. For convenience of description, FIG. 3 will be described with reference to reference numerals/marks of FIG. 1.

The memory cell array 121 includes a plurality of memory blocks BLK1, BLK2, BLK3 to BLKi. For example, each of the plurality of memory blocks BLK1 to BLKi includes a plurality of pages. The write operation and the read operation may be performed for each page. The erase operation may be performed for each memory block. That is, write and read operations may be performed by units of page, and erase operations may be performed by units of blocks. The memory cell array 121 is connected to the address decoder 122 through word lines WL or selection lines (not shown) and is connected to the page buffer circuit 123 through bit lines BL. One page may be connected to one word line. The plurality of memory blocks BLK1 to BLKi may be distinguished according to an operational characteristic or a structural characteristic of the nonvolatile memory device 120.

The address decoder 122 is configured to decode the address ADDR received from the memory controller 110. Here, the address ADDR may be a physical address translated by the flash translation layer 130. The address decoder 122 may select at least one of the word lines WL based on the decoded address ADDR and may drive the selected word line.

The page buffer circuit 123 may operate as a write driver or a sense amplifier depending on a mode of operation. During a write operation, the page buffer circuit 123 may supply a bit line voltage corresponding to write data to the bit lines BL of the memory cell array 121. During a read operation, the page buffer circuit 123 may sense data stored in a selected memory cell through the bit lines BL.

During a write operation, the data input/output circuit 124 provides the data "DATA" provided from the memory controller 110 to the page buffer circuit 123 through data lines DL. During a read operation, the data input/output circuit 124 receives the data "DATA" from the page buffer circuit 123 through the data lines DL. The data input/output circuit 124 may output the received data "DATA" to the memory controller 110.

The control logic circuit 125 may control the address decoder 122, the page buffer circuit 123, and the data input/output circuit 124 in response to the command CMD and the control signal CTRL provided from the memory controller 110. The write operation, the read operation, or the erase operation of the nonvolatile memory device 120 may be performed based on the command CMD, under control of the control logic circuit 125.

Figure 4:
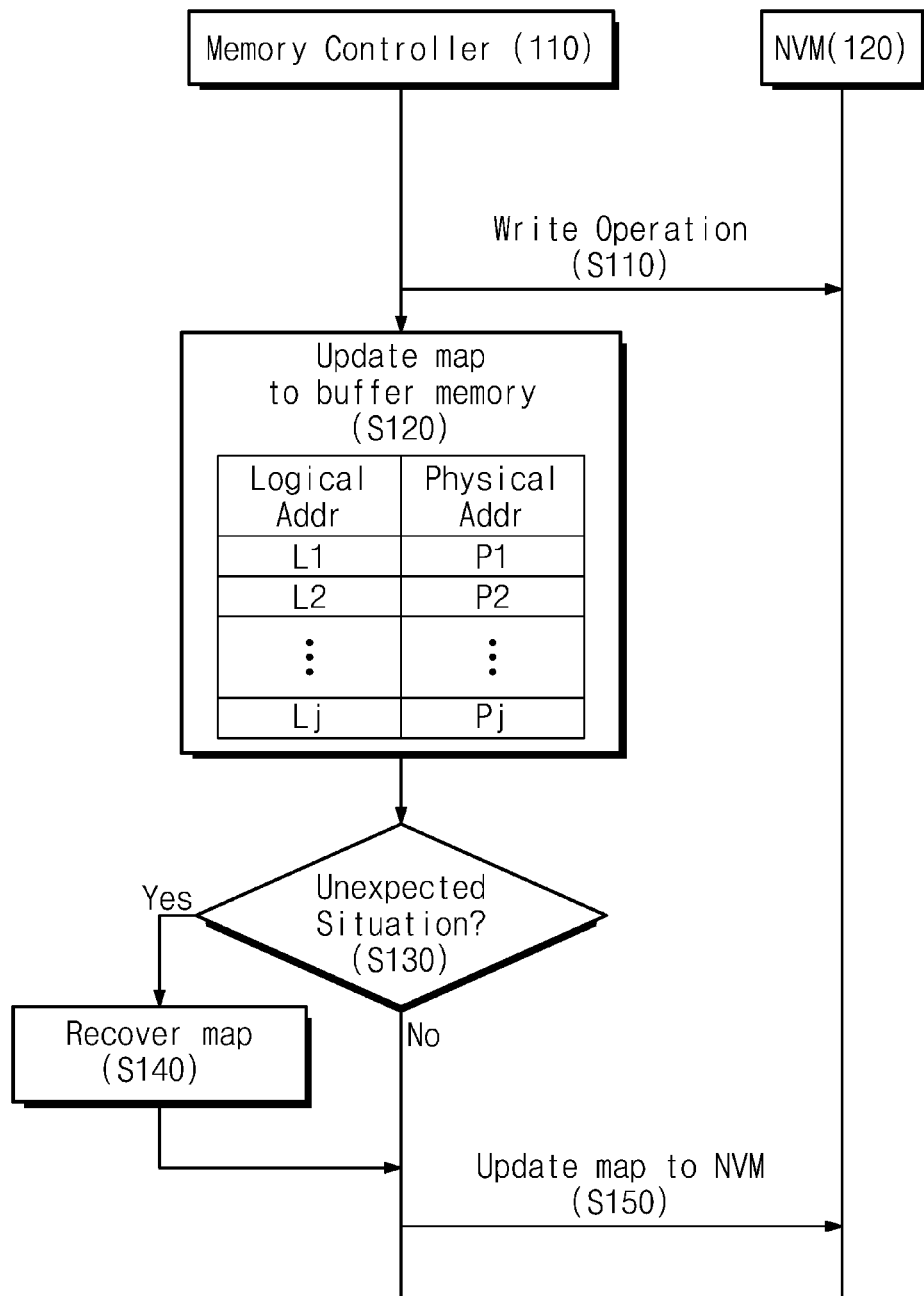
FIG. 4 illustrates a flowchart of an operating method of a storage device of FIG. 1.

FIG. 4 illustrates a flowchart of an operating method of a storage device of FIG. 1. FIG. 4 shows a flowchart associated with an operation of recovering a map in the case where a map formed by the write operation of the storage device 100 is lost. Operations of FIG. 4 may be performed by the memory controller 110 and the nonvolatile memory device 120 included in the storage device 100 of FIG. 1. For convenience of description, FIG. 4 will be described with reference to reference marks/numerals of FIG. 1.

In operation S110, the memory controller 110 performs the write operation corresponding to a write command. The flash translation layer 130 may translate a logical address corresponding to the write command to a physical address used in the nonvolatile memory device 120. The memory controller 110 may write data at a page corresponding to the physical address. To this end, the memory controller 110 may provide data, the physical address, and the write command to the nonvolatile memory device 120.

While the write operation is performed, the write check manager 140 of the memory controller 110 generates the check data. The check data may be associated with data written before data written in operation S110. However, the inventive concepts are not limited thereto, as the check data may be associated with data written in operation S110. The check data may be written at a page corresponding to the physical address provided together with the write data corresponding to the write command.

In operation S120, the memory controller 110 updates a map in a buffer memory (e.g., buffer memory of the memory controller 110). The map may be implemented with a mapping table which is used to translate a logical address to a physical address. A plurality of physical addresses P1, P2 to Pj respectively corresponding to a plurality of logical addresses L1, L2 to Lj may be recorded at the mapping table. A physical address corresponding to a logical address may be changed according to the write operation of operation S110. The memory controller 110 may write a change in a relationship between the logical address and the physical address in the buffer memory.

In operation S130, the memory controller 110 determines whether an unexpected situation has occurred in the storage device 100. The memory controller 110 may determine the unexpected situation. The unexpected situation may for example mean a situation in which the map stored in the buffer memory is erased or the map is not updated in the buffer memory. For example, the unexpected situation may be a sudden power-off in which power is not supplied to the storage device 100. In this case, data stored in the buffer memory, which includes a volatile memory such as an SRAM, may be erased. However, the inventive concepts are not limited thereto. For example, the unexpected situation may be a situation in which a map updated in the buffer memory is not stored or erased due to a system halt or a system crash.

The map stored in the buffer memory may be stored in the nonvolatile memory device 120 so as to be managed even in the unexpected situation. However, in the case of writing map information in the nonvolatile memory device 120, which map information is changed whenever a write operation is requested/performed, an operating delay may occur, thereby causing the reduction of performance of the storage device 100. Accordingly, after continuously updating the changed map information in the buffer memory of the memory controller 110 at a speed faster than the nonvolatile memory device 120, the memory controller 110 may write the map information stored in the buffer memory in the nonvolatile memory device 120 during a flush period. In this case, the number of times that an access to the nonvolatile memory device 120 is made to update the map decreases, and a speed of the write operation increases. The flush period may be defined as a period at which map information managed in the buffer memory is updated to the nonvolatile memory device 120. When an unexpected situation occurs before the map stored in the buffer memory is written in the nonvolatile memory device 120 (Yes in S130), operation S140 is performed. When the unexpected situation does not occur (No in S130), operation S150 is performed.

In operation S140, the memory controller 110 recovers a map which is not updated in the buffer memory. To this end, the memory controller 110 may read the check data stored in the nonvolatile memory device 120. The memory controller 110 may recover at least a portion of the map, based on the check data. The memory controller 110 may predict a plurality of logical addresses and a plurality of physical addresses, which correspond to data written before operation S110, as well as a logical address and a physical address corresponding to the check data. Here, the plurality of logical addresses and the plurality of physical addresses may be calculated under the assumption that the address corresponding to the check data has a sequentiality with previous addresses.

In operation S150, the memory controller 110 updates the recovered map in the nonvolatile memory device 120. The memory controller 110 may write the recovered map information in the nonvolatile memory device 120 during the flush period. In this case, even though an unexpected situation such as sudden power-off occurs, an operation of the storage device 100 may be easily performed by reading the map from the nonvolatile memory device 120.

Figure 5:
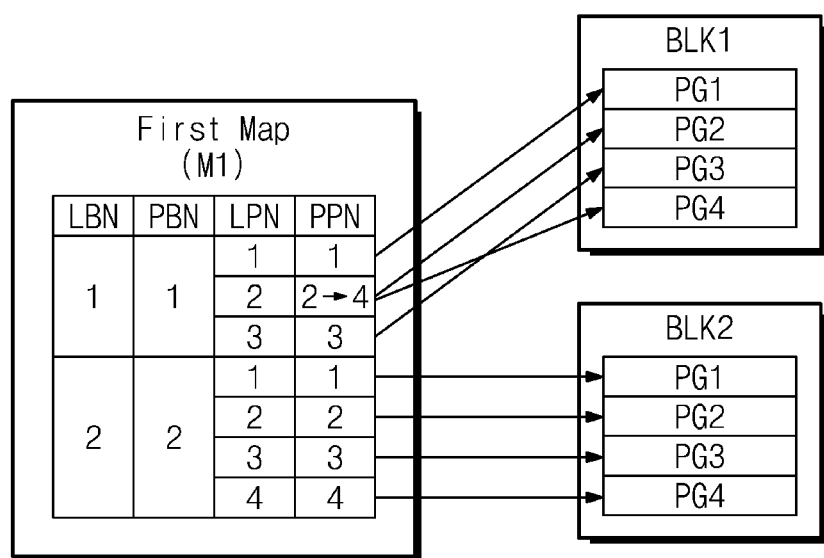
FIG. 5 illustrates a diagram explanatory of an operation of writing data based on a map of FIG. 4.

FIG. 5 illustrates a diagram explanatory of an operation of writing data based on a map of FIG. 4. Referring to FIG. 5, a logical address is translated to a physical address by a (first) map M1, and data are written in the first memory block BLK1 or the second memory block BLK2. The first memory block BLK1 and the second memory block BLK2 are included in the nonvolatile memory device 120 described with reference to FIGS. 1 to 4.

The map M1 includes information about a logical block number LBN, a physical block number PBN, a logical page number LPN, and a physical page number PPN. The logical block number LBN may be associated with block information of a logical address provided from the host together with a write command and write data. The physical block number PBN may be associated with block information of a physical address which is used in the nonvolatile memory device 120. The logical page number LPN may be associated with page information of the logical address. The physical page number PPN may be associated with page information of the physical address.

For convenience of description, it is assumed that a first physical block number having a value of "1" corresponds to the first memory block BLK1, and a second physical block number having a value of "2" corresponds to the second memory block BLK2. Also, it is assumed that first, second, third, and fourth physical page numbers respectively having a "1" value, a "2" value, a "3" value, and a "4" value correspond to first, second, third, and fourth pages PG1, PG2, PG3, and PG4, respectively.

It is assumed that the first memory block BLK1 is a memory area in which data are written non-sequentially (or randomly). First data corresponding to the first logical block number and the first logical page number are written at the first page PG1 of the first memory block BLK1. Second data corresponding to the first logical block number and the second logical page number are written at the second page PG2 of the first memory block BLK1. Third data corresponding to the first logical block number and the third logical page number are written at the third page PG3 of the first memory block BLK1. Fourth data corresponding to the first logical block number and the second logical page number are written at the fourth page PG4 of the first memory block BLK1. In this case, a physical page number corresponding to the second logical page number is changed from "2" to "4". The second page PG2 of the first memory block BLK1 may be an invalid page.

It is assumed that the second memory block BLK2 is a memory area in which data are written sequentially. First data corresponding to the second logical block number and the first logical page number are written at the first page PG1 of the second memory block BLK2. Second data corresponding to the second logical block number and the second logical page number are written at the second page PG2 of the second memory block BLK2. Third data corresponding to the second logical block number and the third logical page number are written at the third page PG3 of the second memory block BLK2. Fourth data corresponding to the second logical block number and the fourth logical page number are written at the fourth page PG4 of the second memory block BLK2. The first to fourth pages PG1 to PG4 of the second memory block BLK2 may be valid pages.

Below, an operation of a storage device in the case where data are non-sequentially written such as in a write operation of the first memory block BLK1 of FIG. 5, and an operation of a storage device in the case where data are sequentially written such as in a write operation of the second memory block BLK2 of FIG. 5, will be described.

Figure 6:
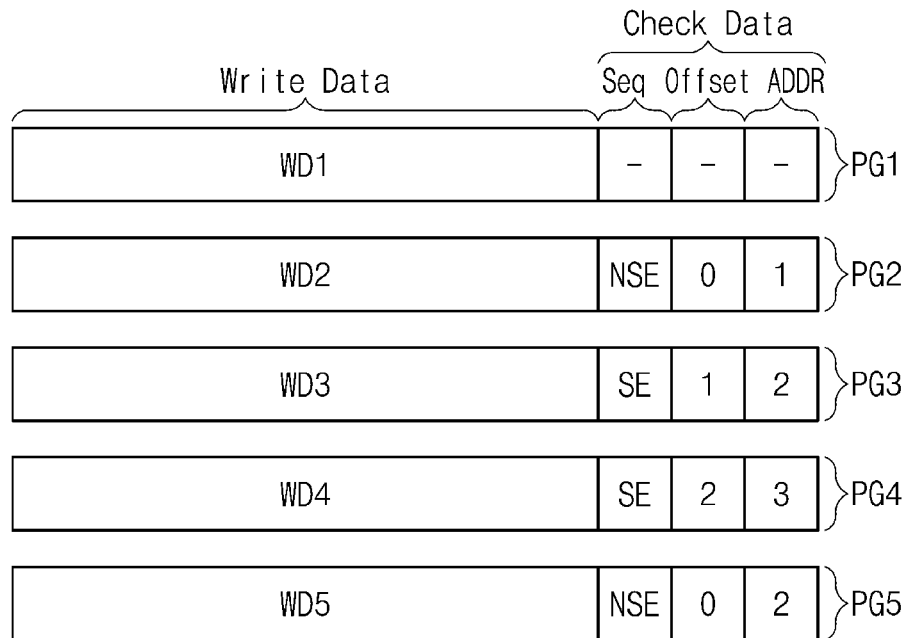
FIG. 6 illustrates an exemplary diagram of data written in a first memory block of FIG. 5.

FIG. 6 illustrates an exemplary diagram of data written in the first memory block of FIG. 5. Data which are written partially non-sequentially at first to fifth pages PG1 to PG5 are illustrated in FIG. 6. Write data and check data are written at the respective pages PG1 to PG5. Even though the fifth page PG5 of the first memory block BLK1 is not illustrated in FIG. 5, description will be given under the condition that the first memory block BLK1 further includes the fifth page PG5.

The write data may be data which are provided from a host so as to be respectively stored at the first to fifth pages PG1 to PG5 based on a write command and a logical address. The first to fifth pages PG1 to PG5 store first to fifth write data WD1 to WD5, respectively. Write data are stored at a portion of a page. Each of the first to fifth pages PG1 to PG5 may include a spare area in which write data are not stored.

The check data may be stored in the spare area of each of the first to fifth pages PG1 to PG5. Since the check data are stored in the spare area of the nonvolatile memory device 120, when a map is lost due to an unexpected situation, the check data will not be lost. The check data may be generated by the write check manager 140 of FIG. 1, and the memory controller 110 may read the check data for the purpose of recovering the lost map.

The check data corresponding to the first write data WD1 may be stored at the second page PG2. This is shown in FIG. 6. The check data corresponding to the first write data WD1 may thus be generated while the second write data WD2 are written. In a case where the check data corresponding to the first write data WD1 are instead stored at the first page PG1, a write operation associated with the first page PG1 may be delayed until the check data are generated. However, in accordance with the embodiment of FIG. 6, while the second write data WD2 are written, the check data corresponding to the first write data WD1 are generated and are then stored at the second page PG2, thus reducing a delay of the write operation. Likewise, the check data corresponding to the second to fourth write data WD2 to WD4 may be respectively stored at the third to fifth pages PG3 to PG5.

The check data may include sequence data Seq. The sequence data Seq may be generated based on a sequentiality of a logical address corresponding to check data. The write check manager 140 of FIG. 1 may determine a sequentiality of a logical address and a physical address corresponding to write data, and may generate a value of the sequence data Seq. In the case where a logical address and a physical address have a sequentiality, the sequence data Seq may have a sequential identification value SE. If not, the sequence data Seq may have a non-sequential identification value NSE. For example, the sequential identification value SE may be "1", and the non-sequential identification value NSE may be "0". However, the inventive concepts are not limited thereto.

In detail, referring to FIGS. 5 and 6, since a page does not exist before the first page PG1, sequence data stored at the second page PG2 has the non-sequential identification value NSE. Since logical and physical addresses of the second page PG2 are "2", and logical and physical addresses of the first page PG1 are "1", sequence data stored at the third page PG3 has the sequential identification value SE. Since logical and physical addresses of the third page PG3 are "3", and logical and physical addresses of the second page PG2 are "2", sequence data stored at the fourth page PG4 has the sequential identification value SE. Since a logical address of the fourth page PG4 are "2", and a logical address of the third page PG3 are "3", sequence data stored at the fifth page PG5 has the non-sequential identification value NSE.

The sequence data Seq may be used to determine a reference address. Hereinafter, a logical address of a page having the non-sequential identification value NSE is defined as a reference logical address, or in other words a reference address. Later, in an operation of recovering a map, the memory controller 110 may read a last page where data are lastly stored, and a page before a page where the non-sequential identification value NSE is stored, and may skip reading remaining pages.

The check data may include offset data Offset. The offset data may be generated based on a difference between a logical address corresponding to write data and a reference logical address. The write check manager 140 of FIG. 1 may determine a value of the offset data. Referring to FIGS. 5 and 6, since the reference logical address (i.e., the reference address) corresponding to the first to third write data WD1 to WD3 is "1" (because in this case the first page PG1 has the non-sequential identification value NSE), offset data respectively stored at the second to fourth pages PG2 to PG4 have values of "0" to "2". Also, since a reference logical address corresponding to the fourth write data WD4 is "2", offset data stored at the fifth page PG5 may have a value of "0". In this case, the addresses of the second and third pages PG2 and PG3 may be characterized as target addresses, and the check data of the second and third pages PG2 and PG3 may be respectively characterized as target check data.

Offset data may be used to determine a page (or pages) to be skipped in an operation of recovering a map. That is, the offset data may be used to determine pages that may be skipped and do not need to be read during the operation of recovering a map. The number of pages to be skipped may correspond to a value of offset data. For example, to recover a map, in the case where the fifth page PG5 is read, since a value of offset data is "0", the fourth page PG4 may be read without skipping a page. In the case where the fourth page PG4 is read, since a value of offset data is "2", the second and third pages PG2 and PG3 may be skipped. In the case where the fourth page PG4 is read, it8 may be predicted that a third logical address is 3, a second logical address is "2" obtained by subtracting "1" from "3", and a first logical address is "1" obtained by subtracting "2" from "3".

The check data may include the address ADDR. Here, the address ADDR may be a logical address. In detail, the address ADDR may be a logical page number. For example, in the case of reading the fifth page PG5, it is difficult to predict a logical page number corresponding to a physical page number having a value of "4" only by using offset data of "0". Accordingly, to calculate a logical address of non-sequentially read data, the address ADDR may be included in the check data. However, the inventive concepts are not limited thereto. For example, the check data may include data for predicting a logical address not sequential, instead of the address ADDR.

In an embodiment, the check data stored at the first page PG1 may not be marked, but may have a specified value. For example, the sequence data Seq may have the non-sequential identification value NSE such as "0", and a value of offset data may be "0".

Figure 7:
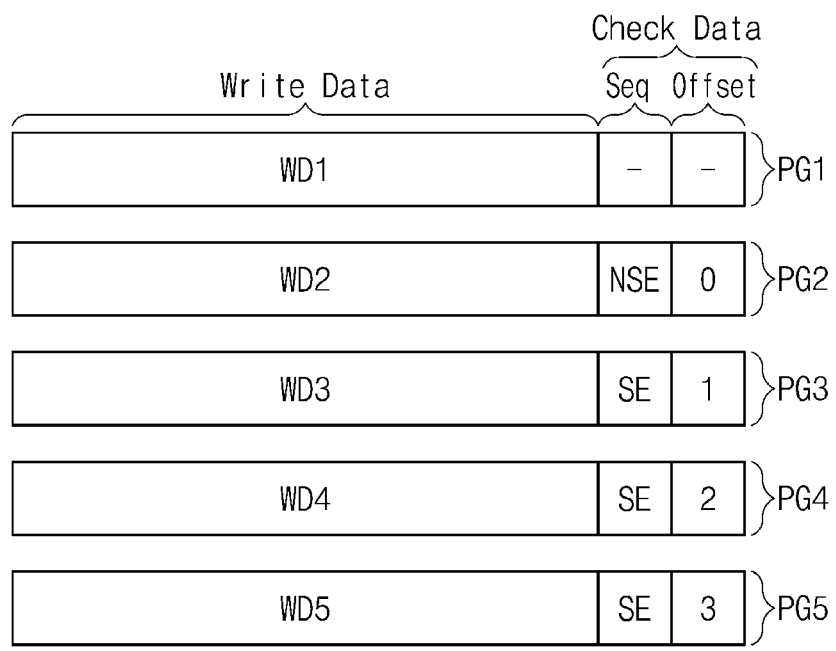
FIG. 7 illustrates an exemplary diagram of data written in a second memory block of FIG. 5.

FIG. 7 illustrates an exemplary diagram of data written in the second memory block of FIG. 5. Data which are written sequentially at the first to fifth pages PG1 to PG5 are illustrated in FIG. 7. Each of the first to fifth pages PG1 to PG5 may include write data and check data. Even though the fifth page PG5 of the second memory block BLK2 is not illustrated in FIG. 5, description will be given under the condition that the second memory block BLK2 further includes the fifth page PG5.

Like FIG. 6, the first to fifth pages PG1 to PG5 store first to fifth write data WD1 to WD5, respectively. Check data corresponding to the first to fourth write data WD1 to WD4 may be respectively stored at the second to fifth pages PG2 to PG5. The check data may be stored in the spare area of each of the first to fifth pages PG1 to PG5.

The check data may include sequence data Seq. The sequence data Seq may be generated based on a sequentiality of a logical address corresponding to check data. Since a page does not exist before the first page PG1, sequence data stored at the second page PG2 may have the non-sequential identification value NSE. Since data are written in the second memory block BLK2 in the order of a logical page number LPN and a physical page number PPN, sequence data Seq stored at each of the third to fifth pages PG3 to PG5 have the sequential identification value SE.

The check data may include offset data Offset. The offset data may be generated based on a difference between a logical address corresponding to write data and a reference logical address. Since data are written in the second memory block BLK2 in the order of a logical page number LPN and a physical page number PPN, offset data respectively stored at the second to fifth pages PG2 to PG5 may have values of "0" to "3".

In the case where a sequential write operation is performed, check data may not include an address. In the case where write data are sequentially written in the order of address, a logical page number may be predicted from offset data. Since a correlation between a value of offset data and a logical address is uniform over all pages, a logical page number may be predicted from offset data. In an embodiment, the check data stored at the first page PG1 may not be marked, but may have a specified value like FIG. 6.

Figure 8:
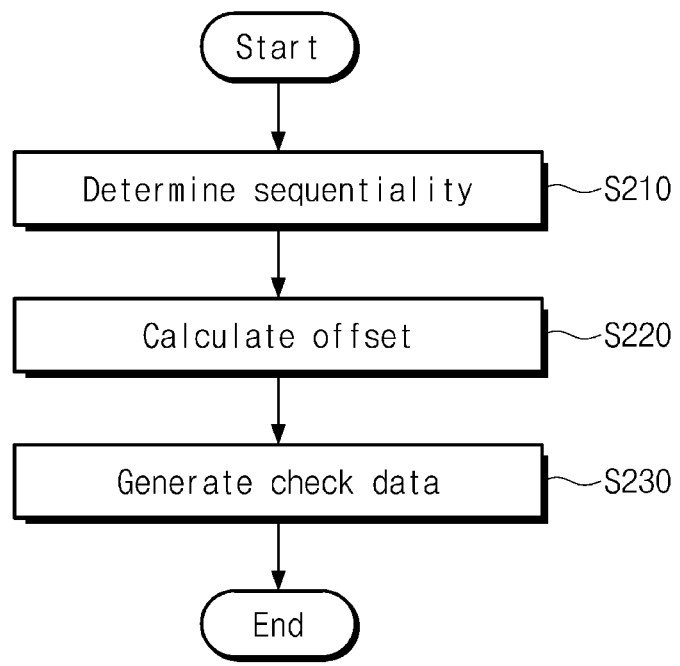
FIG. 8 illustrates a flowchart of an operating method of a storage device for generating check data of FIG. 6 or 7.

FIG. 8 illustrates a flowchart of an operating method of a storage device for generating check data of FIG. 6 or 7. Operations of FIG. 8 may be performed by the write check manager 140 included in the memory controller 110 of FIG. 1. As described with reference to FIGS. 6 and 7, the operations of FIG. 8 may be performed after write data corresponding to check data are written in the nonvolatile memory device 120, and while next write data provided from the host are processed. For convenience of description, FIG. 8 will be described with reference to reference numerals/marks of FIG. 1.

In operation S210, the write check manager 140 determines a sequentiality of an address corresponding to write data. The write check manager 140 may compare an address (hereinafter to as a "first address") corresponding to data written immediately before the write data and an address (hereinafter referred to as a "second address") corresponding to the write data currently written. For example, the first address may include a first logical page number and a first physical page number. The second address may include a second logical page number and a second physical page number. In the case where the second physical page number sequentially follows the first physical page number, and the second logical page number sequentially follows the first logical page number, the write check manager 140 may determine that the address has a continuity.

In operation S210, the write check manager 140 generates sequence data corresponding to the write data, based on a result of determining a continuity. In the case where it is determined that the address has a continuity, sequence data may have a sequential identification value. In the case where it is determined that the address does not have a continuity, sequence data may have a non-sequential identification value In operation S220, the write check manager 140 calculates an offset of the address corresponding to the write data. Offset data may be a difference value between a logical address (i.e., a logical page number) corresponding to the write data and a reference logical address (i.e., a reference logical page address). The reference logical address may be a logical address of the write data having the non-sequential identification value in operation S210. The write check manager 140 may generate offset data having a value obtained through the offset calculation operation. For example, after the write data corresponding to the reference logical address are written, the write check manager 140 may generate the offset data by accumulating an offset value as much as "1" whenever write data are provided from the host.

In operation S230, the write check manager 140 generates check data. The check data may include the sequence data generated in operation S210 and the offset data generated in operation S220. However, the inventive concepts are not limited thereto. For example, if necessary, the write check manager 140 may further include a logical address in the check data. Also, if necessary, check data corresponding to specific write data may include a logical address instead of offset data. The generated check data may be stored in a spare area of the nonvolatile memory device 120 together with write data in a next write operation.

Figure 9:
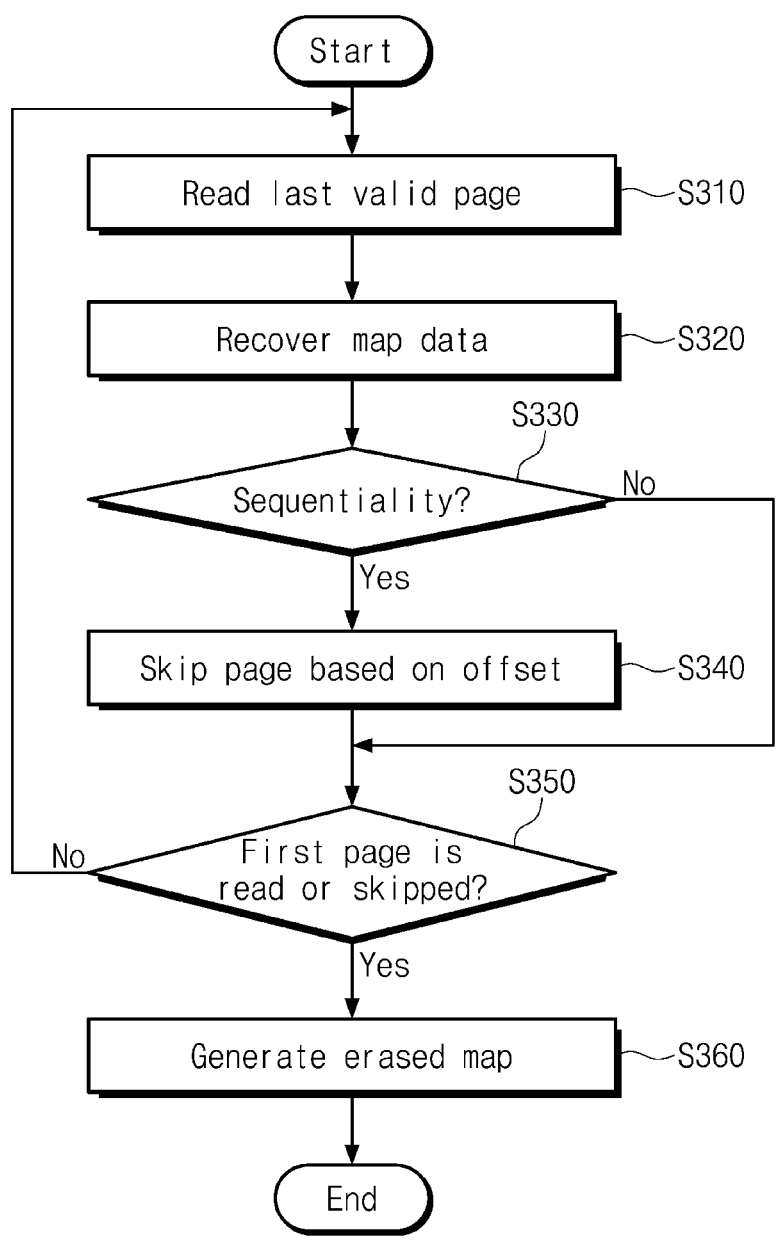
FIG. 9 illustrates a flowchart of an operating method of a storage device for recovering a map through check data generated through operations of FIG. 8.

FIG. 9 illustrates a flowchart of an operating method of a storage device for recovering a map through check data generated through operations of FIG. 8. Operations of FIG. 9 may be performed by the memory controller 110 of FIG. 1. For example, the operations of FIG. 9 may be performed by the flash translation layer 130 included in the memory controller 110. FIG. 9 may be viewed as a flowchart detailing operation S140 of FIG. 4. For convenience of description, FIG. 9 will be described with reference to reference numerals/marks of FIG. 1.

In operation S310, the memory controller 110 reads a last valid page. The last valid page may be a page, at which data are lastly written, from among a plurality of pages included in a memory area (or a memory block). For example, the last valid page may be a page having the greatest physical page number among pages where data are written. In the case where a map is lost due to sudden power-off, it may be difficult for the memory controller 110 to immediately detect the last valid page. For example, although not limited thereto, the memory controller 110 may detect a last valid page through a binary search.

In operation S320, the memory controller 110 recovers map data, based on check data stored at the last valid page. The map data may include a logical address and a physical address of at least one of the plurality of pages. The number of addresses to be recovered by the memory controller 110 may be determined according to a value of offset data included in the check data. That is, an address corresponding to the at least one page may be recovered based on the offset data value. For example, in the case where the offset data value is "0", only an address corresponding to the last valid page may be recovered. As a further example, in the case where the offset data value is "2", an address corresponding to the last valid page and addresses corresponding to two additional pages may be recovered.

In operation S330, the memory controller 110 determines whether the read page is a page having a continuity. The memory controller 110 may determine a continuity of the read page based on the offset data value or sequence data. For example, in the case where the offset data value is "0" or the sequence data has a non-sequential identification value, the memory controller 110 may determine that the read page does not have a continuity. As a further example, in the case where the offset data value is greater than "0" or the sequence data has a sequential identification value, the memory controller 110 may determine that the read page has a continuity. When it is determined that the read page has a continuity (Yes in S330), operation S340 is performed. When it is determined that the read page does not have a continuity (No in S330), operation S350 is performed.

In operation S340, the memory controller 110 skips at least one page, based on the offset data. Herein a direction to skip is a reverse (backward) direction from an address. For example, in the case where an offset data value is "2", two pages corresponding to two previous addresses may be skipped from the read page. In operation S320, since the addresses of the skipped pages are recovered, it is unnecessary to read the skipped pages for the purpose of recovering a map. Accordingly, compared with the case where all pages are read to recover a map, a time taken to recover a map may decrease.

In operation S350, the memory controller 110 determines whether map data associated with all pages are recovered, based as a result of reading a page or skipping a page. For example, the memory controller 110 may determine whether a first page being a page having the smallest physical address is read or skipped. When the first page is read or skipped (Yes in S350), operation S360 is performed. For example, when the page read in operation S310 is the first page, operation S360 is performed. As a further example, when the first page is skipped in operation S340, operation S360 is performed.

When the first page is not read and is not skipped (No in S350), operation S310 is performed. For example, when the page read in operation S310 does not have a continuity and is not the first page, operation S310 to operation S350 are again performed. For example, when the page determined in operation S340 as being skipped is not the first page, operation S310 to operation S350 are again performed. In the case where operation S310 is again performed, the memory controller 110 may read the last valid page with respect to a page before the read page or with respect to a page not skipped.

In operation S360, the memory controller 110 generates a map erased due to an unexpected situation such as sudden power-off. All map data corresponding to a valid page may be recovered through operation S310 to operation S350. The memory controller 110 may reflect or enter all the recovered map data to the map. For example, the memory controller 110 may record the recovered map data in the form of a mapping table. The generated map may be written in the nonvolatile memory device 120 during a flush period.

Figure 10:
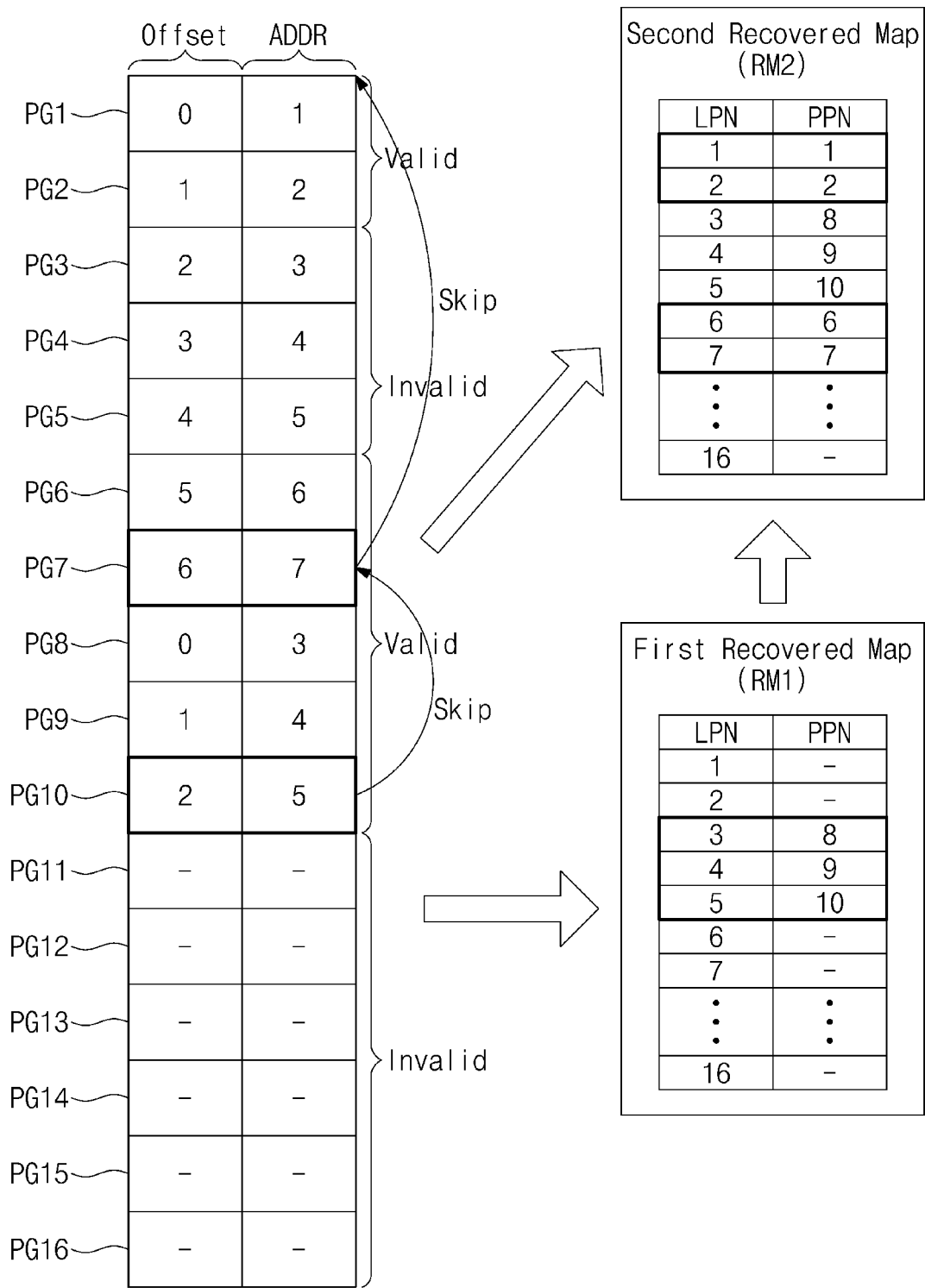
FIG. 10 illustrates a diagram explanatory of the process of recovering a map in the case where data are non-sequentially written such as in FIG. 6.

FIG. 10 illustrates a diagram explanatory of the process of recovering a map in the case where data are non-sequentially written such as in FIG. 6. For convenience of description, the process of recovering a map will be described with reference to operations of FIG. 9.

It is assumed that a memory area (or a memory block) includes first to sixteenth pages PG1 to PG16. Also, it is assumed that data are previously written at the first to tenth pages PG1 to PG10. As described above, in the case where check data are written at a next page, data may be written at the first to eleventh pages PG1 to PG11. However, for convenience of description, this condition is omitted in FIG. 10. It is assumed that the offset data Offset and the address ADDR marked at each of the first to tenth pages PG1 to PG10 correspond to the marked page. That is, for example, the check data generated for the first page PG1 includes offset data of "0" and address ADDR of "1". Here, the address ADDR means a logical address, for example, a logical page number.

Referring to FIG. 10 and operation S310 of FIG. 9, the last valid page is read. The last valid page is the tenth page PG10. In an embodiment, the last valid page may be detected through a binary search. In this case, memory controller 110 may confirm the tenth page PG10 as the last valid page, by determining that the eighth page PG8 is a valid page, determining that the twelfth page PG12 is an invalid page, determining that the tenth page PG10 is a valid page, and determining that the eleventh page PG11 is an invalid page.

Referring to FIG. 10 and operation S320 of FIG. 9, a portion of a map is recovered and shown in FIG. 10 as a first recovered map RM1. An offset value of the tenth page PG10 is "2", and a logical address thereof is "5". The memory controller 110 may thus link physical page number "10" corresponding to the tenth page PG10 to logical page number "5". Since the offset value is "2", memory controller 110 may predict that logical page number "4" is linked to physical page number "9", and logical page number "3" is linked to physical page number "8". The eighth and ninth pages PG8 and PG9 are thus skipped based on the offset value of "2". In other words, the portion of the map corresponding to the eight and ninth pages PG8 and PG9 can be determined by the offset values based on the last valid page PG10, and the eight and ninth pages PG8 and PG9 are thus not read.

As a result of the skipping, the seventh page PG7 is read. An offset value of the seventh page PG7 is "6", and a logical address thereof is "7". The memory controller 110 may thus link physical page number "7" to logical page number "7". Since the offset value is "6", as a rule, logical page number "1" to logical page number "6" may be respectively linked to physical page number "1" to physical page number "6" in a one-to-one correspondence. However, since physical page numbers associated with logical page number "3" to logical page number "5" are already recovered, recovery for logical page number "3" to logical page number "5" are omitted. The reason is that the third to fifth pages PG3 to PG5 are considered as invalid pages due to the eighth to tenth pages PG8 to PG10. A map such as a second recovered map RM2 shown in FIG. 10 is thus recovered depending on a read operation of the seventh page PG7.

The map may be recovered by reading the tenth page PG10 and the seventh page PG7. Accordingly, a map may be recovered within a time shorter than a time to recover a map by sequentially reading the first to tenth pages PG1 to PG10.

Figure 11:
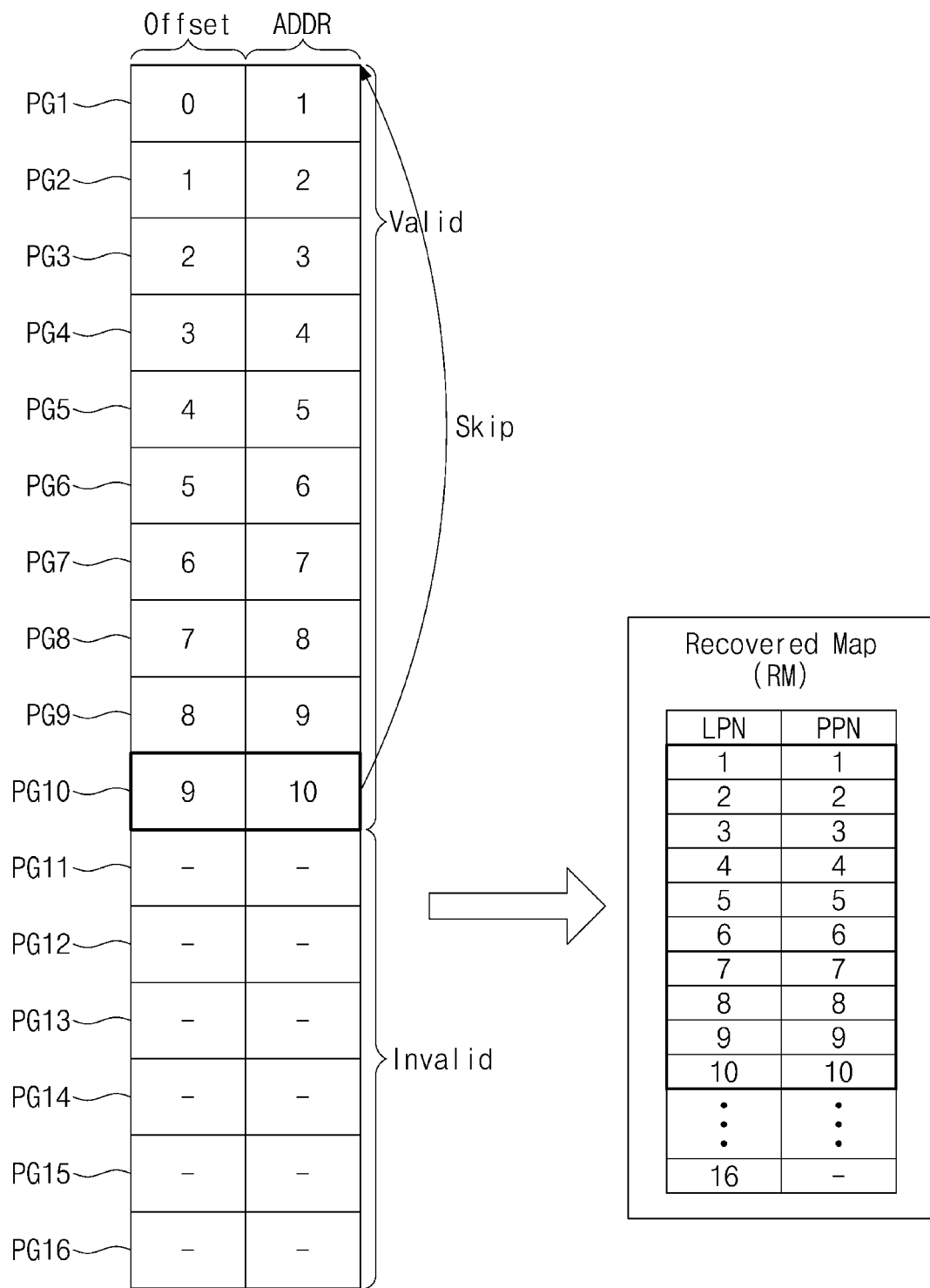
FIG. 11 illustrates a diagram explanatory of the process of recovering a map in the case where data are sequentially written such as in FIG. 7.

FIG. 11 illustrates a diagram explanatory of the process of recovering a map in the case where data are sequentially written such as in FIG. 7. Like FIG. 10, it is assumed that a memory area (or a memory block) includes the first to sixteenth pages PG1 to PG16. It is assumed that the offset data Offset and the address ADDR marked at each of the first to tenth pages PG1 to PG10 correspond to the marked page. Here, the address ADDR means a logical address, for example, a logical page number.

Referring to FIG. 11, a last valid page is read. The last valid page is the tenth page PG10. In an embodiment, the last valid page may be detected through a binary search, which is described with reference to FIG. 10.

A map such as a recovered map RM as shown in FIG. 11 is recovered. An offset value of the tenth page PG10 is "9", and a logical address thereof is "10". In the case where data are sequentially written, offset data and a logical address have a uniform correlation. A memory controller 110 may thus link physical page number "10" corresponding to the tenth page PG10 to logical page number "10". Since the offset value is "9", logical page number "1" to logical page number "9" may be respectively linked to physical page number "1" to physical page number "9" in a one-to-one correspondence. The first to ninth pages PG1 and PG9 are skipped based on the offset value of "9". In other words, the portion of the map corresponding to the first to ninth pages PG1 to PG9 can be determined by the offset values based on the last valid page PG10, and the first to ninth pages PG1 to PG9 are thus not read. Since the first page PG1 is skipped (Yes in S350 of FIG. 9), the recovered map RM is confirmed.

Since the map is recovered by reading the tenth page PG10 and reading no other additional pages, the map may be recovered within a time shorter than a time to recover a map by sequentially reading the first to tenth pages PG1 to PG10.

According to embodiments of the inventive concepts, a storage device including a nonvolatile memory device and an operating method thereof may reduce the time needed to recover a map, by reading check data stored at some pages of the nonvolatile memory device and recovering a map associated with a memory area.

While the inventive concepts have been described with reference to exemplary embodiments thereof, it should be apparent to those of ordinary skill in the art that various changes and modifications may be made thereto without departing from the spirit and scope of the inventive concepts as set forth in the following claims.

What is claimed is:

1. A storage device comprising:
a nonvolatile memory device including a memory area including a first page corresponding to a first physical address and a second page corresponding to a second physical address; and
a memory controller,
wherein, after writing first data at the first page based on a first write command corresponding to a first logical address, the memory controller is configured to write second data at the second page based on a second write command corresponding to a second logical address and to generate first check data corresponding to the first data and second check data corresponding to the second data,
wherein the memory controller is further configured to recover the first and second physical addresses and the first and second logical addresses based on the second check data, and
wherein the second check data includes sequence data having a value which is based on a continuity between the first and second logical addresses.

2. The storage device of claim 1, wherein, when the second physical address is a physical address following the first physical address, and the second logical address is a logical address following the first logical address, the sequence data is generated to have a sequential identification value.

3. The storage device of claim 1, wherein the first check data is generated to include sequence data having a sequential identification value when a third write command received before the first write command corresponds to a third logical address before the first logical address, and is generated to include sequence data having a non-sequential identification value when the third write command does not correspond to the third logical address.

4. The storage device of claim 1, wherein the second check data further includes offset data having a value which is based on a difference between a reference logical address and the second logical address.

5. The storage device of claim 4, wherein a number of addresses to be recovered by the second check data is determined based on the value of the offset data.

6. The storage device of claim 1, wherein the memory controller is configured to write the first check data at the second page together with the second data, based on the second write command.

7. The storage device of claim 1, wherein the memory controller is configured to respectively write the first and second check data at different pages of the memory area, and
wherein, after recovering the first and second physical addresses and the first and second logical addresses based on the second check data, the memory controller is further configured to skip reading the first check data after reading the second check data from the memory area.

8. The storage device of claim 1, wherein the memory controller is configured to respectively write the first and second check data at different pages of the memory area, and wherein, after recovering a map including the first and second physical addresses and the first and second logical addresses based on the second check data, the memory controller is further configured to read a last page corresponding to a last logical address among a plurality of valid pages of the memory area, at which data are written, and then read the page at which the first check data are stored.

9. The storage device of claim 8, wherein the memory controller is configured to detect the last page through a binary search after recovering the map.

10. The storage device of claim 1, wherein, when a map including the first and second physical addresses and the first and second logical addresses is erased responsive to a power-off of the storage device, the memory controller is configured to recover the map.

11. An operating method of a storage device, the storage device including a memory controller and a nonvolatile memory device, the method comprising:

writing, by the memory controller, first data at a first page of the nonvolatile memory device, based on a first write command corresponding to a reference address;

writing, by the memory controller, second data at a second page of the nonvolatile memory device, based on a second write command corresponding to a target address; and generating, by the memory controller, target check data corresponding to the second data, based on a continuity between the target address and an address generated before the target address that corresponds to a third write command, and based on a difference between the reference address and the target address.

12. The method of claim 11, wherein the generating of the target check data comprises:

generating sequence data corresponding to the second data, based on the continuity; and generating offset data corresponding to the second data, based on the difference.

13. The method of claim 11, wherein a difference between the reference address and an address generated before the reference address that corresponds to a fourth command, is different from a difference between the reference address and an address generated after the reference address that corresponds to a fifth write command.

14. The method of claim 11, further comprising, after writing the second data at the second page, writing third data and the target check data at a third page of the nonvolatile memory device, based on a fourth write command.

15. The method of claim 11, further comprising:

recovering a map by determining the reference address and the target address erased from a buffer memory, based on the target check data; and writing the recovered map in the nonvolatile memory device.

16. An operating method of a storage device, the method comprising:

writing data in a memory area including a plurality of pages in order of physical page number;

generating check data corresponding to each of the plurality of pages;

reading a last page storing data from among the plurality of pages; and recovering a portion of a map indicating physical page numbers corresponding to logical page numbers of pages from among the plurality of pages, based on check data from among the generated check data that corresponds to the last page, wherein the check data includes an offset value between a physical page number of a reference page of the plurality of pages and a physical page number corresponding to the check data.

17. The method of claim 16, wherein the recovering of the portion of the map comprises determining map information corresponding to pages from among the plurality of pages in order from the last page to the reference page while decreasing the offset value.

18. The method of claim 16, further comprising recovering at least another portion of the map based on check data from among the generated check data corresponding to a page from among the plurality of pages in order before the reference page.

19. The method of claim 18, wherein the recovering of the another portion of the map comprises skipping determining a physical page number corresponding to a target logical page number when the physical page number corresponding to the target logical page number is determined in the recovering of the portion of the map.

* * * * *